United States Patent [19]

Phipps

[11] 4,199,310
[45] Apr. 22, 1980

[54] EXTRUSION APPARATUS
[75] Inventor: Arthur L. Phipps, Los Osos, Calif.
[73] Assignee: Condec Corporation, Old Greenwich, Conn.
[21] Appl. No.: 922,541
[22] Filed: Jul. 10, 1978
[51] Int. Cl.² .......................... B29D 27/00; B29F 3/02
[52] U.S. Cl. ...................................... 425/71; 138/106;
138/108; 138/175; 248/49; 248/74 B; 264/51;
264/562; 264/101; 264/178 R; 264/DIG. 78;
285/53; 285/235; 285/236; 285/237; 285/374;
425/817 C; 425/DIG. 60
[58] Field of Search ............. 264/51, 101, 102, 178 R,
264/DIG. 78; 425/4 R; 248/49, 129, 148, 36, 74
B; 285/235, 374, 53, 236, 237; 138/175, 176,
177, 106, 108; 52/264, 245, 40

[56] References Cited
U.S. PATENT DOCUMENTS

| 1,470,529 | 10/1923 | Gerber | 248/49 |
|---|---|---|---|
| 1,646,423 | 10/1927 | Schaub | 248/49 |
| 1,990,434 | 2/1935 | Kohler | 264/101 X |
| 2,037,084 | 4/1936 | Moore | 285/374 X |
| 2,113,083 | 4/1938 | Height | 248/49 |
| 2,151,298 | 3/1939 | Miller | 248/49 |
| 2,179,629 | 11/1939 | Hering | 138/175 X |
| 2,307,915 | 1/1943 | Boardman | 248/49 |
| 2,420,838 | 5/1947 | Osborn | 285/374 X |
| 2,525,662 | 10/1950 | Freeman | 264/102 X |
| 2,821,416 | 1/1958 | Soehnlen et al. | 285/374 X |
| 2,937,889 | 5/1960 | Palmese | 285/374 X |
| 3,100,658 | 8/1963 | Miller et al. | 285/235 X |
| 3,459,312 | 8/1969 | Britcher et al. | 248/129 X |
| 3,700,266 | 10/1972 | Glehn | 285/235 X |
| 3,704,083 | 11/1972 | Phipps | 264/51 X |
| 3,799,197 | 3/1974 | Gibbons | 248/49 X |
| 4,044,084 | 8/1977 | Phipps | 264/51 |
| 4,101,117 | 7/1978 | East et al. | 248/49 X |
| 4,107,254 | 8/1978 | Webster et al. | 264/102 X |

FOREIGN PATENT DOCUMENTS

| 557063 | 5/1957 | Belgium | 285/374 |
|---|---|---|---|
| 880677 | 6/1953 | Fed. Rep. of Germany | 285/374 |
| 379853 | 9/1964 | Switzerland | 285/374 |
| 1080305 | 8/1967 | United Kingdom | 285/235 |
| 1233088 | 5/1971 | United Kingdom | 264/101 |

Primary Examiner—Philip Anderson
Attorney, Agent, or Firm—Maky, Renner, Otto & Boisselle

[57] ABSTRACT

A foam extrusion apparatus and method employs an extruder on an upper level extruding foamable extrudate into the upper end of a large elongated barometric leg which extends at a relatively shallow angle into a pool of water at a lower level. A conveyor in the barometric leg extends through a large radius in the pool to guide the extrudate from the pool for further processing. The leg is in the form of an elongated pipeline fabricated from sections and supported on an inclined ramp. Some of the sections are securely anchored to the ramp to resist axial forces when the leg is evacuated. The sections may be reinforced concrete or fabricated reinforced steel of a variety of sectional shapes. Each section is sealed end-to-end so that a vacuum within the leg will draw water from the pool into the leg leaving a vacuum chamber at the upper end of the leg in which the extrudate expands. The leg may be provided with a number of windows for visual access and the two levels may be the floors of two horizontally and vertically separated plants. The lower end of the leg may be provided with a baffle where it enters the pool.

28 Claims, 13 Drawing Figures

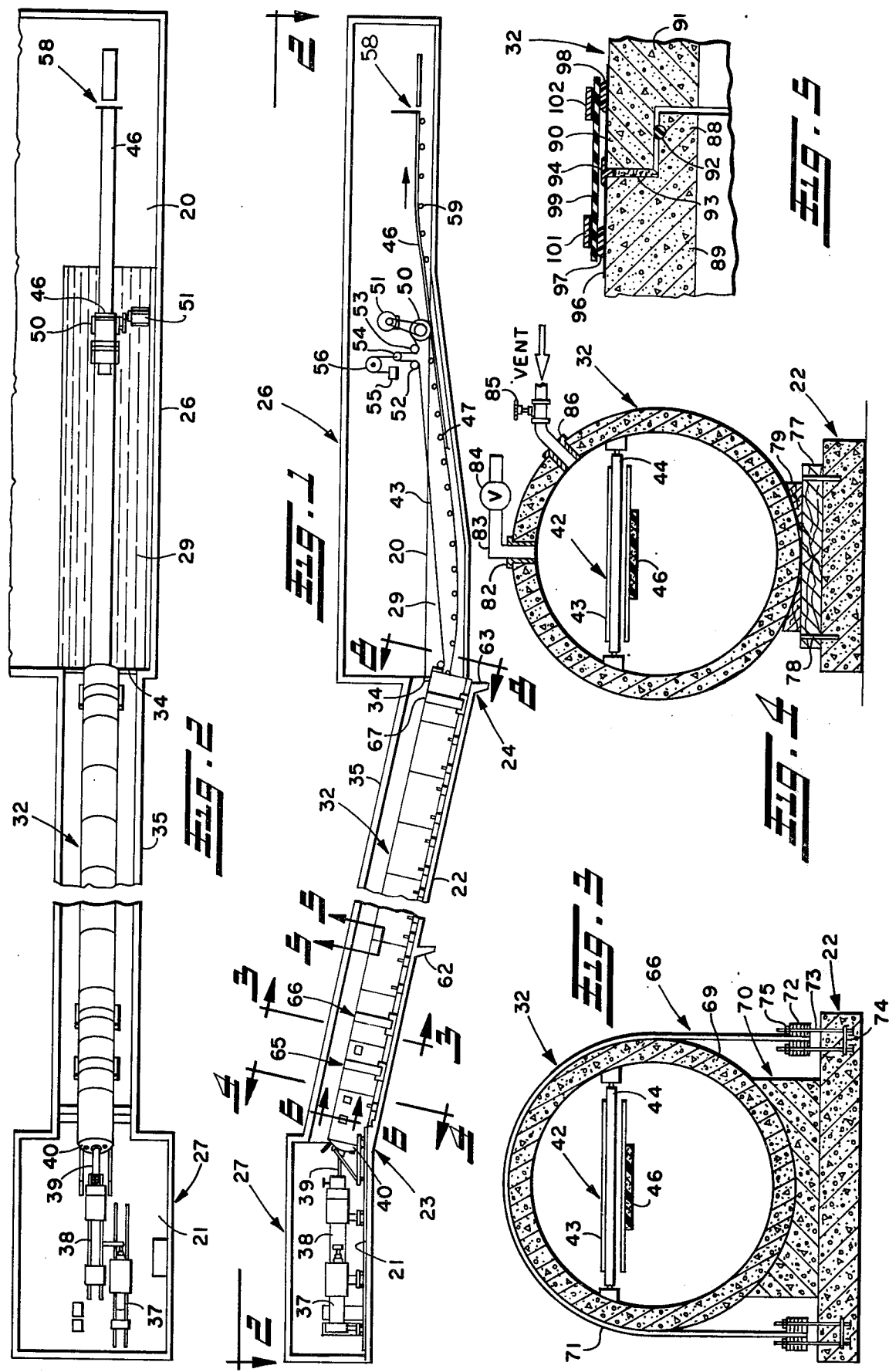

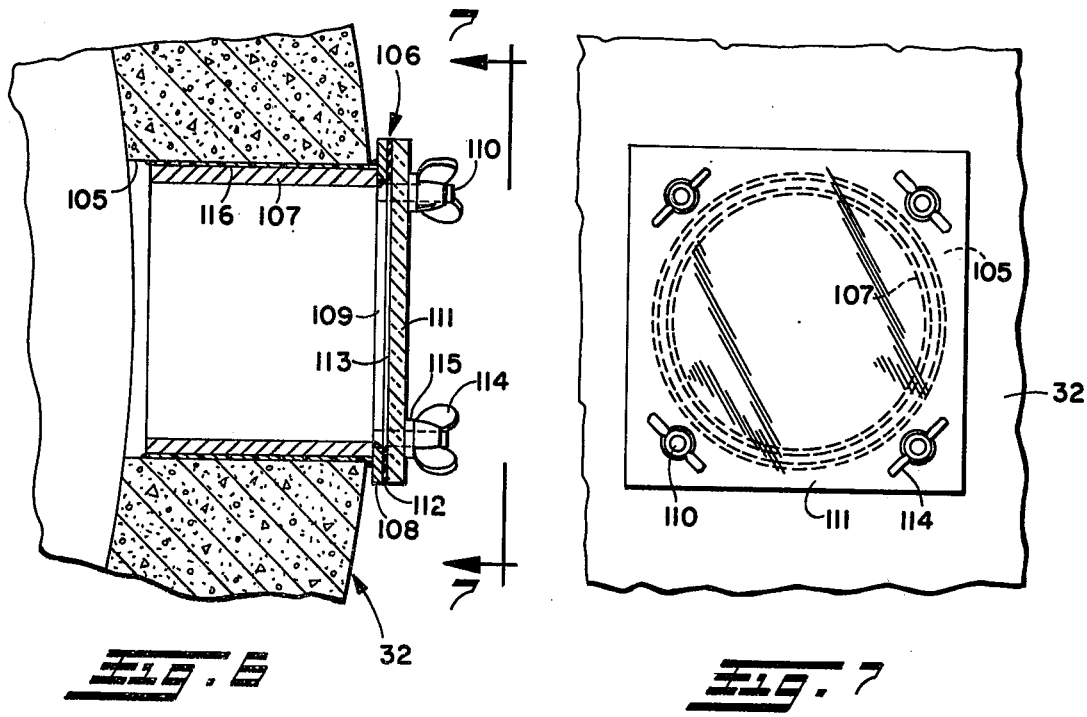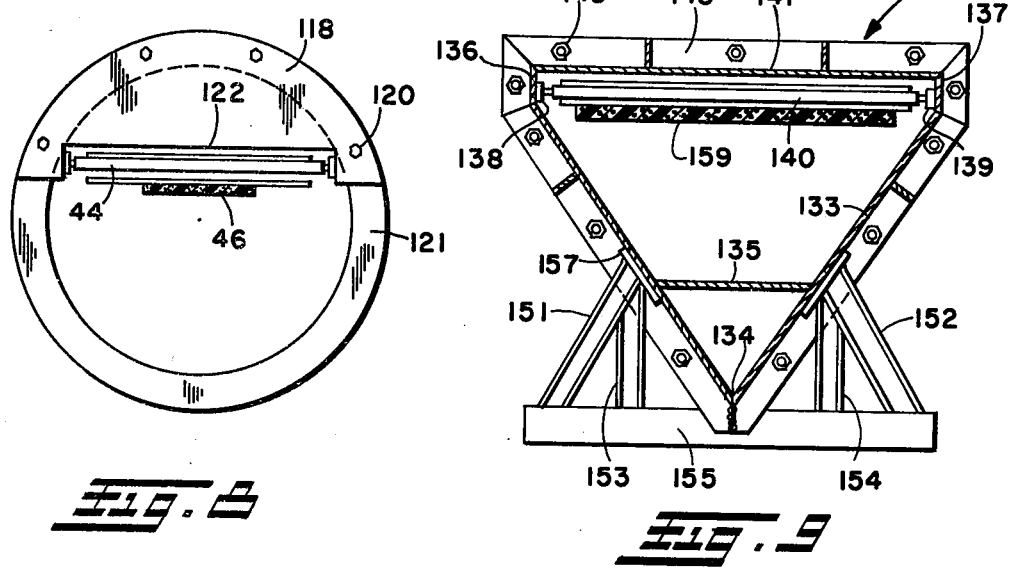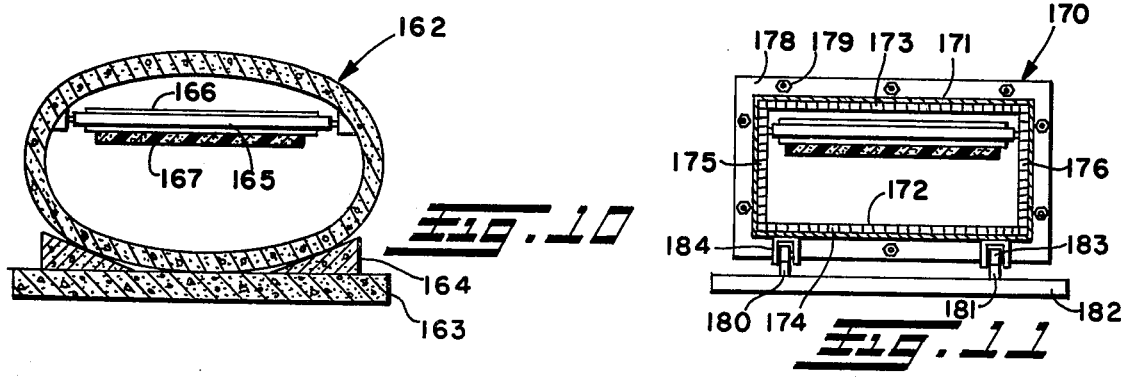

EXTRUSION APPARATUS

This invention relates generally as indicated to a foam extrusion apparatus and method and more particularly to the construction and fabrication of a large barometric leg which when evacuated is essentially filled with water but which includes a vacuum chamber at its upper end into which the extrudate passes from the die for expansion.

BACKGROUND OF THE INVENTION

It is known that the formation of extruded foams in the form of billets or boards is enhanced by the employment of a vacuum chamber so that the expansion of the foam is accomplished under subatmospheric pressure. Examples of vacuum foam extrusion apparatus and methods may be seen in prior U.S. Pat. Nos. to Nelson et al 3,584,108, Maxon 3,169,272, Cogiano 3,822,331 and U.K. Pat. No. 1,233,088. In vacuum extrusion technology, a most difficult problem to solve is the curing and extraction of the material from the vacuum chamber, especially delicate or fragile material such as styrene foam in the form of large boards or billets. This problem has been solved by the employment of an inclined barometric leg as seen in applicant's prior U.S. Pat. Nos. 3,704,083 and 4,044,084.

On a small or laboratory scale, the construction and operation of a barometric leg is a relatively simple matter. However, in a large scale plant, a number of problems are encountered in the construction, fabrication and operation of the leg. For example, the size of the leg itself creates a number of problems in view of the forces thereon when the leg is evacuated to form the vacuum chamber and essentially to fill the leg with water.

SUMMARY OF THE INVENTION

In accordance with the present invention there is provided a large scale foam extrusion plant and process which employs one or more extruders on an upper level extruding foamable extrudate into the upper end of a large elongated barometric leg which extends at a relatively shallow angle into a pool of water at a lower level. A conveyor in the barometric leg extends through a large radius in the pool to guide the extrudate from the pool for further processing, such as cutting to size and length.

The leg is in the form of an elongated pipeline fabricated from sections and supported on an inclined ramp. Some of the sections are securely anchored to the ramp to resist axial forces when the leg is evacuated. The sections may be of reinforced concrete, circular or oval, or a fabricated reinforced steel of a variety of sectional shapes. Each section is sealed end-to-end so that a vacuum within the leg will draw water from the pool into the leg leaving a vacuum chamber at the upper end of the leg in which the extrudate expands. The various forms of the pipe sections of the leg may be provided with windows for visual access and the lower end of the leg for certain forms of pipe sections may be provided with a baffle where the leg enters the pool. The two levels at each end of the leg may be the floors of two horizontally as well as vertically separated plants.

It is accordingly a principal object of the invention to provide a large scale foam extrusion line which includes an inclined barometric leg with the leg being in the form of an elongated pipe fabricated from sections.

Another principal object is the provision of such extrusion line wherein the leg is supported on an inclined ramp and includes anchors for some of such sections securing the sections to the ramp to withstand axial forces on the leg.

Another important object is the provision of a foam extrusion apparatus which includes a large diameter elongated pipe through which the extrudate passes with the pipe being formed of a plurality of sections connected end-to-end and sealed so that the pipe as a whole may be evacuated to form a vacuum chamber to facilitate the expansion of foam.

Another object is the provision of such apparatus wherein the pipe sections are each interconnected to form a vacuum seal whereby the leg may be evacuated to draw water from a pool at the lower end of the leg into the leg essentially to fill the same.

Still another object is the provision of foam extrusion apparatus which comprises a first platform at a lower elevation with a second platform at a higher elevation horizontally spaced from the first with an inclined ramp extending from the edge of the second platform to a position beneath the facing edge of the first platform and into a pool supported beneath the first platform.

Still another object is the provision of such apparatus wherein the upper and lower levels constitute the floors of two different buildings at two different elevations.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a side elevation of a two level plant in accordance with the present invention with the two levels being interconnected by the barometric leg, such leg being shown broken away and greatly foreshortened;

FIG. 2 is a top plan view broken away of the two level plant seen in FIG. 1;

FIG. 3 is an enlarged transverse section taken substantially on the line 3—3 of FIG. 1 illustrating a preferred circular concrete pipe section and the manner in which one or more of such sections is anchored to the ramp supporting the same;

FIG. 4 is a view similar to FIG. 3 taken substantially on the line 4—4 of FIG. 1 and illustrating the manner in which the sections may be supported on the ramp;

FIG. 5 is an enlarged longitudinal fragmentary section through a vacuum seal joint between end-to-end pipe sections as seen from the line 5—5 of FIG. 1;

FIG. 6 is an enlarged fragmentary section taken substantially from the line 6—6 of FIG. 1 illustrating one of a number of windows or view ports in the barometric leg;

FIG. 7 is a plan view of the window seen from the line 7—7 of FIG. 6;

FIG. 8 is a section taken substantially on the line 8—8 of FIG. 1 illustrating the lower end of the barometric leg as it enters the pool illustrating the baffle covering the top portion of the end pipe section;

FIG. 9 is a transverse section of a fabricated steel barometric leg pipe section of inverted trianglar form;

FIG. 10 is a transverse section of a concrete pipe section wherein the section is elliptical or oval in cross-section;

FIG. 11 illustrates a steel fabricated pipe section using relatively thin steel plate or sheet metal supported internally by a fabricated rectangular frame of grating;

DESCRIPTION OF THE ILLUSTRATED EMBODIMENTS

Figure 12:
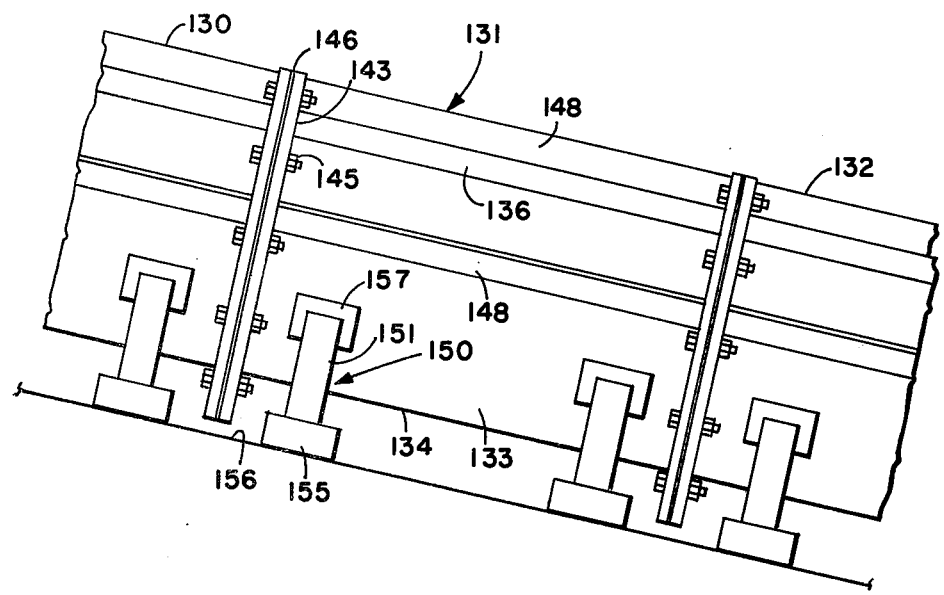
FIG. 12 is a side elevation illustrating the manner in which metallic fabricated pipe sections may be supported and interconnected.

Referring first to FIGS. 1 and 2 it will be seen that there is a first platform 20 at a lower elevation and a second platform 21 at a higher elevation horizontally spaced from the first platform. An inclined ramp 22 extends from the front edge 23 of the second platform to a position 24 which is beneath the facing edge of the first platform 20. The platforms 20 and 21 may constitute the floors of two separate buildings, respectively shown at 26 and 27 which are horizontally spaced and at different elevations. The platform 20 is provided with a pool 29 which may be formed of reinforced sprayed concrete much in the fashion of an ordinary Gunite swimming pool.

An elongated pipe or barometric leg shown generally at 32 is positioned on the ramp 22 and extends from the edge 23 of the upper platform or building through end wall 34 confining the pool 29. As seen more clearly in FIG. 2 the barometeric leg or pipeline 32 may be covered as well as walkways 35 providing access on either side to the leg and interconnecting the upper and lower buildings. In the illustration of FIGS. 1 and 2 the horizontal and vertical spacing of the buildings are greatly foreshortened for convenience of illustration only. For example, the platform 21 may be approximately 8.6 meters above the platform 20 and the leg 32 may be approximately 52.8 meters long and inclined at an angle of approximately 12°. It will be appreciated that the length and angle of inclination may vary.

Because of the length and size of the leg or pipeline, it is fabricated in sections joined end-to-end and sealed. Each of the sections is supported on the ramp 22 to form a continuous linear pipeline of the length indicated. For example, the leg or pipeline may be formed of twenty-two sections, each 2.4 meters in length. Each section may be approximately 1.68 meters in inside diameter having a wall thickness of approximately 15.87 cm. As seen from FIGS. 3, 4 and 5, the sections illustrated in the preferred embodiment are fabricated of reinforced concrete similar in form to large diameter sewer or pipe sections. Such sections are generally similar in form and will not each be described in detail.

Although two separate buildings are illustrated it will be appreciated that the platforms may be in a single building on two floors or two buildings interconnected by a trestle supporting the leg.

In the upper building 27 on platform 21 there is supported for movement toward and away from the upper end of the leg 32 a mixing extruder 37 and a somewhat larger cooling extruder 38 in tandem forcing the extrudate through pipe 39 to a die, not shown, on the inside of the bulkhead 40 closing the upper end of the leg in the position illustrated. The extruders may each be mounted for movement toward and away from the upper end of the leg as is the bulkhead to provide access to the die interiorly of the leg and to open and close the upper end of the leg. Reference may be had to applicant's co-pending application entitled "Foam Extrusion Apparatus and Method", Ser. No. 922,542, filed July 10, 1978, for a more detailed disclosure of the construction and operation of the extruders, bulkhead and die.

Situated within the leg and extending throughout substantially its entire length is a conveyor 42 which includes a belt 43 trained above and below conveyor rolls 44 journaled within the sections of the leg. As seen in FIGS. 3 and 4, above the rolls 44 the conveyor belt is moving up the leg and below the belt it is moving down the leg supporting the foam extrudate as indicated at 46 maintaining the extrudate spaced from the walls of the leg. Without the conveyor, the extrudate would simply float to the top of the pipeline or leg.

As the belt enters the pool 29, it passes beneath a large number of rollers 47 arranged in a long radius extending upwardly, of, for example, 30.5 meters. There may be a large number of such rollers and they may be spaced approximately 13 per meter. The belt 43 extends beneath such rollers and about relatively large diameter drive sheave 50 driven by motor 51. The belt then passes between idler sheaves 52 and 53 and about tensioning sheave 54 which may be urged upwardly by weight 55 connected to such sheave by cable trained around pulley 56. As the extrudate passes beneath the drive sheave 50, it will leave the pool of water and from the conveyor 43 to a cut-off 58 the extrudate will be supported on a series of rolls 59 which may be arranged again in a long radius of the approximate extent of 30.5 meters but this time the center of the radius is beneath the extrudate.

The roller arrangement 47 and 59 is in the arrangement of a reverse curve with the rollers 47 supporting the belt 43 while the rollers 59 underlie the extrudate and form an idler roller table therefor moving the same into the cut-off.

It will be appreciated that other processing equipment other than the cut-off may be employed in the building 26. Additional cutting or forming equipment may be provided and also scrap or reclaim extruders and pelletizers may be included.

The ramp 22 extending between the upper and lower platforms may include special footers such as seen at 62 and 63 in FIG. 1 to resist gravitational forces since the ramp extends at approximately an inclination of 12°.

When the barometric leg is evacuated, there will also be a substantial axial force thereon occasioned by atmospheric pressure on the end closure 40. As indicated, the leg is formed of substantially similar segments of reinforced concrete pipe which may be supported on or secured to the ramp as indicated more clearly in FIGS. 3 and 4.

In order to resist such axial forces, in the embodiment illustrated in FIG. 1, the two sections next to the top section may be anchored to the ramp as indicated at 65 and 66. Also, the lowermost section may be anchored to the ramp as seen at 67. A typical anchor is seen in greater detail in FIG. 3. The pipe section 69 is supported on a port concrete sleeper or grout pad 70 on top of the ramp 22, such sleeper embracing a substantial peripheral portion of the underside of the pipe section. A flexible steel band approximately 6.4 mm thick and approximately 45.7 cm. wide is wrapped over the top of the pipe section as seen at 71. Each end of the strap has secured thereto anchor blocks 72 which include vertical apertures receiving vertically extending bolts 73 which are embedded in the ramp 22 and secured in such ramp by a weld plate 74. There may be four such bolts on each side of the pipe section. The upper end of each bolt is threaded to receive a nut 75, which may be tightened to a predetermined torque firmly to clamp the pipe section to the sleeper in turn securing it to the ramp. The strap may be positioned essentially centrally of each pipe section.

As seen more clearly in FIG. 4, pipe sections which are not anchored to the ramp may be simply supported on wooden sleepers, preferably two per section, seen at 77 secured to the ramp by dowel pins 78. Wooden wedges 79 may be employed properly to center the pipe sections.

Also as seen in FIG. 4, the upper pipe section may be provided with a fitting 82 through which line 83 extends connected to vacuum pump 84 whereby the interior of the leg may be evacuated. The subatmospheric pressure within the leg may be controlled by a vent valve 85 similarly connected to the interior of the leg through fitting 86.

With the exception of the end faces of the two end sections of the pipe or leg, each is formed at each end with a bell and spigot to facilitate joining as seen more clearly in FIG. 5. The spigot 88 of the section 89 telescopes within the bell 90 of the adjoining section 91. An O-ring 92 is provided in a groove in the spigot deformed by the bell in conventional manner. However, the end face of the bell and the adjoining shoulder of the spigot may be calked by oakum which is a loose fiber which is commonly used for the calking of seams of ships as seen at 93. An acrylic calking compound seen at 94 may be employed to seal the outer edge of the oakum calking.

The outer surface of the concrete pipe sections may be provided with two coats of epoxy paint seen at 96 for a width of approximately 30.5 cm. centered on the joint.

Two beads of acrylic calking compound seen at 97 and 98 extend circumferentially of each pipe section. A strip of neoprene or buna rubber 99 is then wrapped around the beads of acrylic calking compound. One layer is sufficient with an overlap of approximately 30 cm. The overlap may be provided with a rubber adhesive on the overlay. The neoprene or rubber strip 99 may be approximately 25.4 cm. wide by 1.59 mm. thick.

Finally, steel banding straps 101 and 102 are employed and are drawn snug. In the condition illustrated in FIG. 5, the bands are not yet drawn snug and when tightened, they will tend to flatten the beads of calking compound seen at 97 and 98. With the joint illustrated, a suitable vacuum seal is provided.

The entire exterior of each pipe section may be, if desired, provided with a coating of epoxy paint and if any pinhole leaks develop, grout or putty may be applied exteriorly at the leak to ensure the vacuum integrity of the pipeline as a whole.

In order to provide visual access to the interior of the pipeline or leg throughout its length and more particularly in the area of the die at the upper end, a plurality of portholes 105 may be cut in the wall of the pipe sections as seen more clearly in FIG. 6. The opening may be readily cast in place or provided by a circular concrete saw. Situated in the opening is a fitting 106 which includes a cylindrical element or sleeve 107 which telescopes within the opening 105 from the exterior of the pipe. Welded to the exterior of the cylindrical element or sleeve is a plate 108 having a circular opening 109 therein and a square exterior configuration as seen more clearly in FIG. 7. Secured to the plate at the four corners thereof beyond the circular opening are threaded studs 110 which pass through holes in clear plastic plate 111. A neoprene or like gasket 112 is situated between the plate 108 and the clear plastic plate 111. The gasket is of course provided with a circular opening 113 corresponding to the opening 109 in the plate 108. The clear plastic plate may be held in place by thumb nuts 114 with washers 115 interposed between the nuts and the clear plate 111.

Upon assembly, the space between the aperture 105 and the exterior of the sleeve 107 may be filled with an epoxy resin or grout indicated at 116 to provide the necessary vacuum seal. Since all of the pressure upon the port fitting will be from te exterior of the pipe, the fitting as shown and constructed has been found quite adequate.

With reference now to FIG. 8 it will be seen that the lowermost section of the leg which projects through the wall 34 into the pool 29 may be provided with a baffle plate 118. The baffle plate is secured by suitable fasteners 120 to the end face 121 of the lowermost pipe section and a suitable gasket or seal may be provided between the baffle plate and such end face. The lower edge of the baffle plate is provided with a rectangular cut-out 122. The purpose of the baffle is to alter the circular configuration of the lower end of the leg where it enters the pool 29 so that the level of the pool may be drawn down to essentially the top of the cut-out 122 before air bubbles into the leg. This then reduces the weight or head of water above the extrudate 46 as it traverses through the pool.

Although circular concrete reinforced pipe sections are perhaps preferred because of their ready availability, it will be appreciated that the pipe sections may also be fabricated from steel in interconnected lengths and the sectional configuration may be other than circular.

In FIG. 9 there is illustrated a metallic pipe section having the general sectional configuration of an inverted triangle. Referring additionally to FIG. 12 it will be seen that the pipe or barometric leg may be fabricated from a series of fabricated sections connected end-to-end as seen at 130, 131 and 132 in FIG. 12 and each section is fabricated from relatively heavy plate 133. The sidewalls of such plate are interconnected at the bottom as seen at 134 and may be connected by an interior horizontal bridge plate 135 providing a flat bottom. The upper edges of the side plates are connected to relatively short parallel vertical sidewalls seen at 136 and 137 which support the journals 138 and 139 for the conveyor roll 140. The top of the section is closed by plate 141 which forms the base of the inverted triangle.

The end of each section is provided with a relatively deep outwardly extending flange extending completely peripherally of the section which may be employed to join the sections end-to-end with the plurality of peripherally spaced fasteners seen at 145.

As seen more clearly in FIG. 12, a gasket 146 may be interposed between abutting flanges. Because of the external pressure which would tend to collapse the pipe sections, longitudinal stiffeners or ribs are provided as seen at 148 welded to the exterior of the plate. Such stiffeners or ribs may be of greater depth in the center of the sections than at the ends adjacent the flanges 143. It will be appreciated that more than the illustrated number of stiffeners may be provided.

The inverted triangular pipe sections may be supported on fabricated saddles shown generally at 150. Each saddle includes a pair of opposed diagonal struts seen at 151 and 152 which are braced by vertical struts 153 and 154, respectively, each such strut extending from a horizontal sleeper or footer 155 which is in turn supported on the ramp surface 156. Symmetrically inclined bearing pads parallel to the sidewalls of the pipe section may be provided at the upper end of each set of struts as seen at 157.

The bearing pads are preferably not secured to the sidewalls of the pipe section to permit limited relative longitudinal movement which may be occasioned upon expansion or contraction of the barometric leg as a whole. Because of such expansion or contraction it is preferred that only one or more adjacent sections at either end of the leg be secured or anchored to the ramp.

The inverted triangular configuration of FIG. 9 permits a billet or board workpiece seen at 159 of substantial width and thickness to be accommodated within the leg while still providing enough interior space therebeneath for someone to enter the leg when not in operation for maintenance and inspection purposes. For example, someone laying upon a dolly supported for movement on the horizontal plate 135 may readily be lowered into and elevated through the barometric leg for inspection and maintenance of the interior and the conveyor. It will be seen that with the conveyor positioned in the upper part of the section, a baffle at the lower end of the leg need not be required. If employed, it may be extremely shallow.

In FIG. 10 there is illustrated a concrete pipe section employed to construct the leg. The concrete pipe section 162 is similar to the circular sections illustrated and previously described except that it is oval or elliptical in sectional shape. Such elliptical pipe sections may be joined in the same manner as seen in FIG. 5 and may be supported on sleepers 163 with wood or concrete wedges 164 being employed to center the sections.

Conveyor rolls 165 are journaled interiorly of the section with the belt 166 passing above and below the rolls to support the billet or board 167 on the underside thereof. Again it can be seen that with an elliptical or oval sectional configuration of the pipe a slightly wider conveyor and thus workpiece may be accommodated while still providing interior access below the conveyor. The concrete oval pipe sections may be anchored and supported in the same manner as the circular sections.

Referring now to FIG. 11 there is illustrated a rectangular pipe section again of fabricated steel. In FIG. 11, the pipe sections 170 are formed from plate 171 which may be substantially thinner gauge than the plate 133 utilized in the inverted triangular pipe section in FIG. 9. The plate 171 is supported interiorly by a rectangular frame of grating 172. The top and bottom grating elements 173 and 174 preferably overlap the shorter span sidewall grating elements 175 and 176. In any event, the interior grating frame forms a reticulate framework for supporting the somewhat thinner metal shell 171. Each section is provided with an end flange seen at 178 so that each section may be joined end-to-end through a suitable gasket to an adjacent section by the fasteners seen at 179.

The conveyor rolls for the belt may be journaled in the side grating frames 175 and 176 in the upper portion of the rectangular section of the pipe again providing access therebelow for interior inspection and maintenance.

The sections may be supported on rails 180 and 181 in turn supported on cross ties or sleepers 182 in turn supported on the ramp. Each pipe section may be provided with laterally and longitudinally spaced skids riding on the rails in turn supported from the underside of the sections by the U-shape brackets 184 shown.

Figure 13:
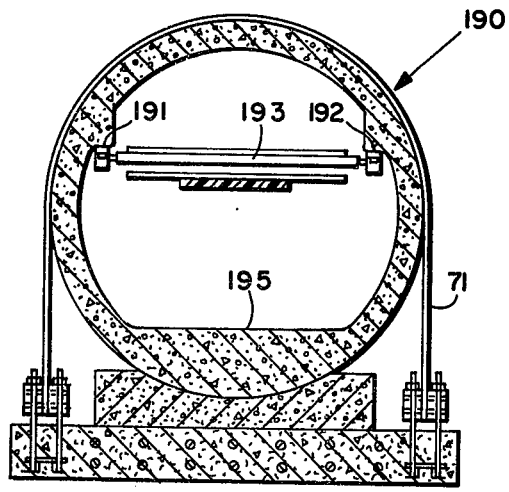
FIG. 13 is a view similar to FIG. 3 but illustrating a slightly modified form of concrete pipe section.

In FIG. 13 there is illustrated a slightly modified form of concrete pipe section shown generally at 190. The concrete pipe section may be extruded or cast in conventional form but is provided with interior projections 191 and 192 into which may be cast or secured journals for the conveyor rolls 193. Also, the bottom interior of the pipe section may be provided with an interior chordal flat or fillet seen at 195 to provide a flat interior bottom to permit maintenance personnel to be conveyed along the interior of the pipeline or leg for the aforementioned maintenance and inspection purposes. The concrete pipe sections of FIG. 13 may be anchored to and supported from the ramp in the same manner as in FIG. 3.

It can now be seen that applicant has provided in a foam extrusion apparatus an inclined barometric leg which is in the form of an inclined large pipe with the pipe being formed of a plurality of sections connected end-to-end and sealed to form a vacuum chamber.

Other modes of applying the principles of the invention may be employed, change being made as regards the details described, provided the features stated in any of the following claims or the equivalent of such be employed.

The embodiments of the invention in which an exclusive property or privilege is claimed are defined as follows:

1. An inclined barometric leg for an extrusion line comprising an inclined elongated pipe extending from a first higher elevation to a pool of water at a second lower elevation, said pipe including a linear series of sections interconnected and sealed to form a vacuum chamber.

2. A leg as set forth in claim 1 wherein said sections are concrete.

3. A leg as set forth in claim 2 wherein said sections are circular.

4. A leg as set forth in claim 2 wherein said interconnected sections are provided with bell and spigot interfitting ends.

5. A leg as set forth in claim 4 including a seal ring between the bell and spigot.

6. A leg as set forth in claim 2 including oakum calking in the exterior of the joint between said sections.

7. A leg as set forth in claim 6 including an acrylic calking covering said oakum calking.

8. A leg as set forth in claim 2 including a circumferential bead of calking on each side of the exterior of the joint between said sections with a wrapping of elastomeric sheeting bridging such beads and circumferentially compressed thereagainst.

9. A leg as set forth in claim 8 including banding compressing said sheeting.

10. A leg as set forth in claim 2 including an epoxy paint on the exterior of each section on each side of the joint.

11. A leg as set forth in claim 1 including an inclined ramp supporting said sections, and anchor means to secure certain of said sections to said ramp.

12. A leg as set forth in claim 11 wherein said anchor means comprises a strap extending over the top of said sections and secured at each end to said ramp.

13. A leg as set forth in claim 12 including threaded studs projecting from said ramp, each end of said strap including blocks through which said studs project, and means to tighten said straps on said studs to a predetermined torque.

14. A leg as set forth in claim 1 wherein said sections are fabricated of metal.

15. A leg as set forth in claim 14 wherein said sections are internally reinforced.

16. A leg as set forth in claim 15 wherein said sections are internally reinforced by a framework of grating.

17. A leg as set forth in claim 16 wherein said sections are rectangular.

18. A leg as set forth in claim 17 wherein said sections are supported on longitudinally extending rails.

19. A leg as set forth in claim 14 wherein said sections are externally reinforced.

20. A leg as set forth in claim 19 wherein said sections are reinforced by longitudinal stiffeners.

21. A leg as set forth in claim 20 wherein said sections are of inverted triangular configuration.

22. A leg as set forth in claim 21 including strut means supporting said sections.

23. A leg as set forth in claim 22 wherein said strut means bear against the outwardly sloping inclined sides of the sections.

24. A leg as set forth in claim 14 including flanges on each end of each section whereby each section may be joined flange-to-flange with a gasket therebetween.

25. A leg as set forth in claim 1 including holes in one or more sections, and view port fittings in said holes.

26. A leg as set forth in claim 1 wherein the lower end of said leg extends at least partially into a pool of water, and a baffle over the upper part of the lowermost section projecting into the pool.

27. Foam extrusion apparatus comprising a first platform at a lower elevation, a second platform at a higher elevation horizontally spaced from the first, an inclined ramp extending from an edge of said second platform to a position beneath the facing edge of said first platform, a pool supported beneath said first platform and closed by a wall at said facing edge, an inclined pipe supported on said ramp extending from the edge of said second platform through said wall and into said pool, means to close the upper end of said pipe, and means to create a vacuum in said pipe to draw liquid from the pool up into said pipe.

28. In a foam extrusion line, an inclined ramp, a barometric leg supported on said ramp, said leg comprising a large diameter pipe fabricated in a series of sections each supported on said ramp in end-to-end alignment, said leg extending at its lower end into a pool of water, and means interconnecting each section of pipe to form a vacuum seal whereby the leg when closed at its upper end may be evacuated to draw the water from the pool into the leg.

* * * * *